United States Patent [19]

Coope

[11] 4,451,026
[45] May 29, 1984

[54] CLAMPING DEVICE

[75] Inventor: Robert L. Coope, Phoenix, Ariz.

[73] Assignee: Stevens Engineering, Inc., Phoenix, Ariz.

[21] Appl. No.: 393,744

[22] Filed: Jun. 30, 1982

[51] Int. Cl.³ .............................................. B23Q 3/08
[52] U.S. Cl. ........................................ 269/24; 269/32; 269/93
[58] Field of Search ............ 269/91, 93, 94, 134–136, 269/24, 32

[56] References Cited

U.S. PATENT DOCUMENTS

| 2,908,205 | 10/1959 | Furman et al. | 269/94 |
| 3,302,943 | 2/1967 | Mericle | 269/94 |
| 3,578,306 | 5/1971 | Smith | 269/94 |
| 3,700,227 | 10/1972 | Sessody | 269/32 |
| 3,724,837 | 4/1973 | McPherson | 269/93 |
| 3,970,296 | 7/1976 | Rameson | 269/93 |
| 3,993,296 | 11/1976 | Daniels | 269/24 |
| 4,365,792 | 12/1982 | Johns | 269/24 |

FOREIGN PATENT DOCUMENTS 1333149 10/1973 United Kingdom ................. 269/94

Primary Examiner—Robert C. Watson
Attorney, Agent, or Firm—Don J. Flickinger

[57] ABSTRACT

A clamping member is urged to move in a first direction along a path substantially parallel to a work supporting surface in response to the application of a single linear force, such as a fluid actuated motor. Stop means limit the travel of the clamping member in the first direction. In response to continued force applied by the fluid motor, the clamping member is caused to move in a second direction anchoring a workpiece to the work supporting surface.

7 Claims, 11 Drawing Figures

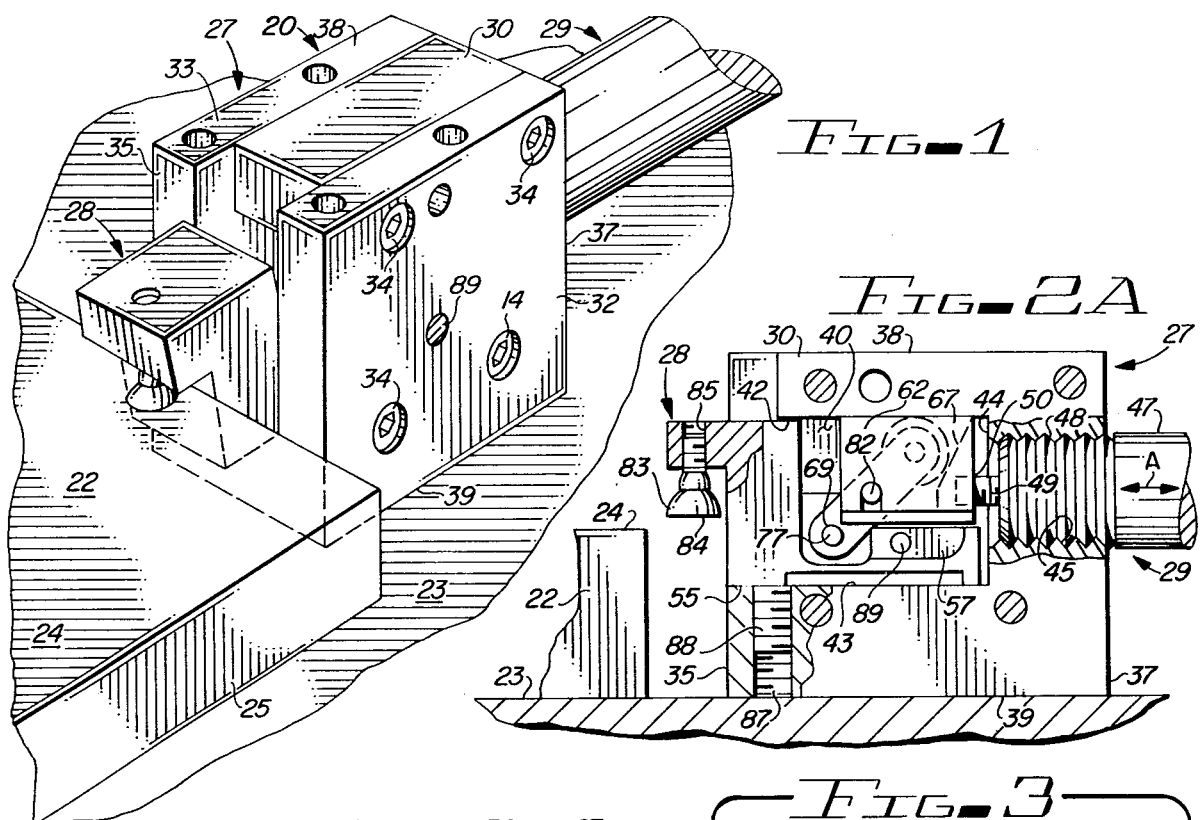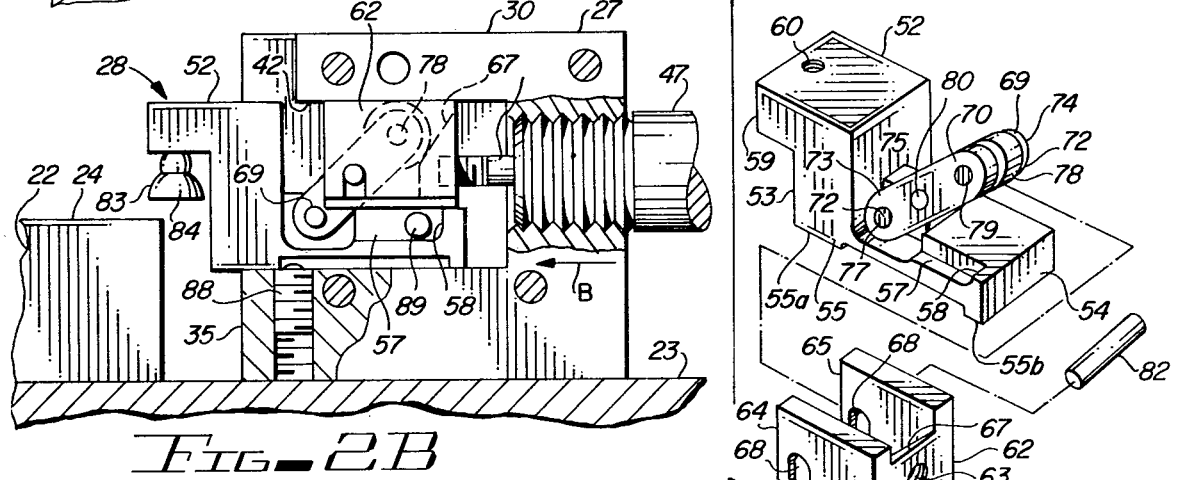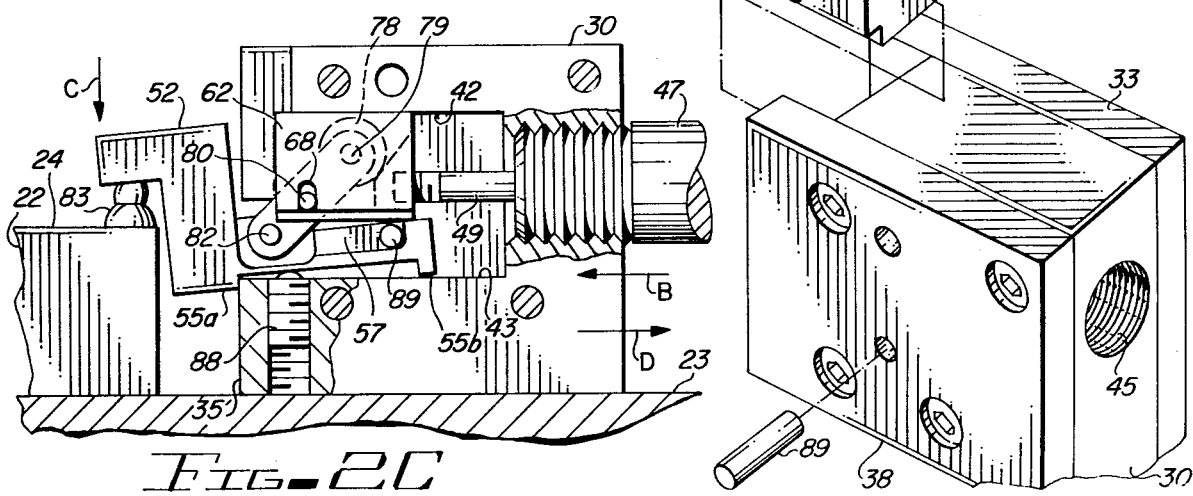

CLAMPING DEVICE

FIELD OF THE INVENTION

This invention relates to clamping devices.

In a further aspect, the present invention relates to devices of the type especially adapted for holding a workpiece.

More particularly, the instant invention concerns an improved clamping device having utility for anchoring a workpiece to a supporting surface.

Prior Art

The prior art is replete with various devices for gripping and holding a workpiece. Frequently used in woodworking, metal working and other crafts, such devices have utility for stabilizing the workpiece while the workpiece is acted upon. Numerous configurations are commercially available to meet the specific requirements of the various industries and to support the workpiece during the performance of manual procedures and machine tool operations.

In general, workpiece holding devices can be classified in either of two categories depending upon structural design and mode of operation. One variety includes a pair of opposed members, usually referred to as jaws, which pinch the workpiece therebetween. Particularly well known and exemplary is the bench vise commonly used by machinists, wood carvers, jewelers, mechanics and other tradesmen. Variations are available for use in connection with machine tools.

Of another type are the assorted devices having a single jaw and especially adapted to anchor the workpiece to a supporting surface. Analagous to devices of the prior category, single jaw devices are also familiar within various crafts. The woodworker, for example, frequently secures a board to a workbench during rigorous activities such as routing and chiseling. In the metal working arts, single jaw devices are commonly employed to anchor a workpiece to the work supporting surface of the table of a machine tool, such as a milling machine, a shaper, or drill press.

The traditional single jaw workpiece securing device generally includes an elongate, pivotally mounted arm having a jaw at one end thereof. Means are provided for moving the arm about the pivot and for locking the arm with the jaw bearing against the workpiece. Exemplary is the well-known toggle clamp commercially available in numerous specific configurations.

While adequately holding a workpiece, the toggle clamp is beset with various limitations. For example, the device is relatively slow acting, a definite disadvantage in mass production applications. Locking is generally the result of a toggle joint with preset or limited strength. The devices tend to consume inordinate space, especially due to the relatively large arm and the length of movement thereof.

In attempts at improvement, the prior art has provided numerous single jaw clamping devices. The influence of the toggle type clamp has indured, however, purported improvements still generally relying upon an elongate pivotally mounted arm having a jaw at one end thereof. Efforts to eliminate the elongate arm has resulted in disproportionately complex linkage mechanisms.

The prior art has also been concerned with the provision of power activated devices. A primary source of power is pressurized fluid, such as hydraulics or pneumatics. Many such devices still rely upon the elongate arm and the toggle mechanism. Endeavoring to eliminate the toggle mechanism, the prior art has resorted to the exceedingly cumbersome and expensive use of dual fluid actuators.

It is apparent, therefore, that the prior art has not provided an entirely satisfactory solution. In addition, certain potentially useful functions and characteristics have been totally ignored.

It would be highly desirable and advantageous, therefore, to remedy the foregoing and other deficiencies inherent in the prior art.

Accordingly, it is an object of the present invention to provide an improved clamping device.

Another object of the invention is the provision of an improved clamping device of the type having a single jaw.

Still another object of the invention is to provide improvements in clamping devices especially adapted for securing a workpiece to a supporting surface.

And still another object of this invention is the provision of a clamping device which can be used in combination with machine tools to stabilize a workpiece during cutting operations.

Yet another object of the invention is to provide means having variable clamping pressure.

Yet still another object of the immediate invention is the provision of a clamping device having abbreviated actuation time.

And a further object of the invention is to provide a clamping device of compact design.

Still a further object of the invention is the provision of a clamping device requiring minimal working space.

And still a further object of the instant invention is to provide a clamping device which may be power actuated.

Yet still another object of the invention is the provision of an improved device of the above type which is relatively simply and durably constructed.

SUMMARY OF THE INVENTION

Briefly, to achieve the desired objects of the instant invention in accordance with a preferred embodiment thereof, first provided is a housing which is securable to a work supporting surface adjacent a workpiece. Carried by the housing is a clamping member movable in a first direction toward the workpiece along an axis substantially parallel to the supporting surface and a second direction toward the supporting surface. Movement in the first direction and in the second direction is accomplished sequentially in response to the application of a single linear force operative along an axis substantially parallel to the axis of the first direction.

Guide means are provided for directing the clamping member along a substantially linear path in the first direction, stop means for terminating movement along the linear path, and translation means for moving the clamping member in the second direction subsequent to termination of movement in the first direction. Workpiece engagement means, carried by the clamping member, contacts the workpiece and urges the workpiece toward the supporting surface. The linear force may be supplied by a piston-type motor actuated by a pressurized fluid.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings, in which:

FIG. 1 is a perspective view of a clamping device embodying the principles of the instant invention as it would appear during use to secure a workpiece to a workpiece supporting surface, the workpiece and the supporting surface being shown in fragmentary illustration;

FIG. 2A is a side elevation view, partly in section, generally corresponding to the view of FIG. 1 and showing the clamping device in the retracted, or rest position, the near side plate of the clamping device being removed for purposes of illustrating internal operative components thereof;

FIG. 2B is a view generally corresponding to the view of FIG. 2A and illustrating the device at an intermediate state of movement;

FIG. 2C is an illustration generally corresponding to the view of FIG. 2A and illustrating the device in the extended or clamping position, as observed in FIG. 1;

FIG. 3 is a partially exploded perspective view of the clamping device of FIG. 1, portions thereof being broken away for purposes of illustration;

DESCRIPTION OF THE PREFERRED EMBODIMENTS

Figure 5:
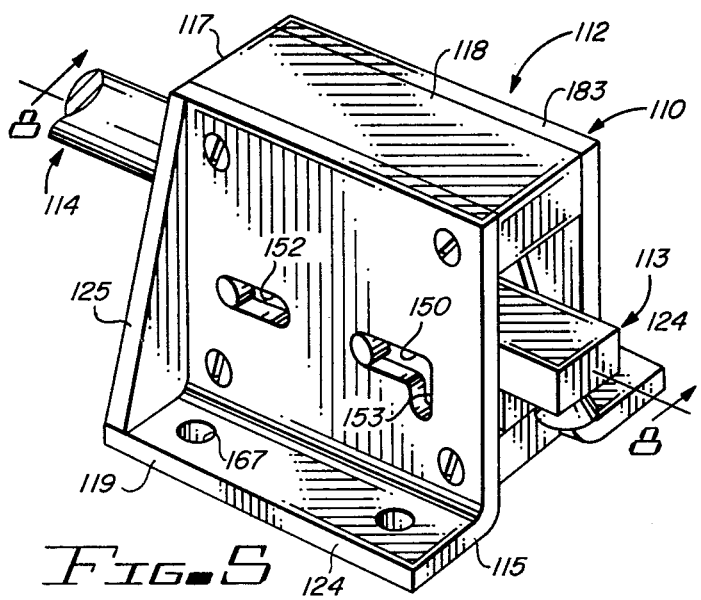
FIG. 5 is a perspective view of an alternate clamping device constructed in accordance with the teachings of the instant invention shown as it would appear in the retracted position.
Figure 4:
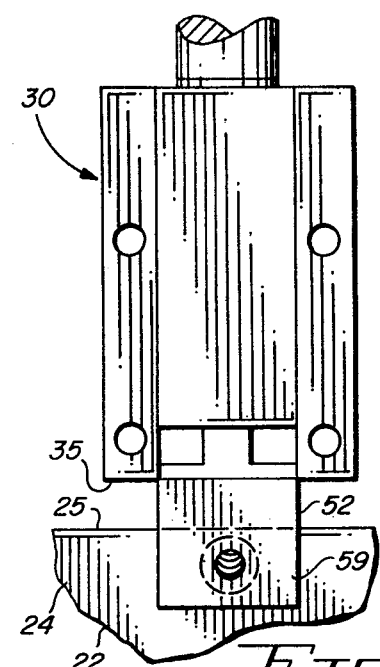
FIG. 4 is a top elevation view taken from the illustration of FIG. 1.

Turning now to the drawings in which like reference characters indicate corresponding elements throughout the several views, attention is first directed to FIG. 1 which shows a clamping device, constructed in accordance with the teachings of the instant invention and generally designated by the reference character 20, as it would appear when employed to anchor workpiece 22 to supporting surface 23. Surface 23 is intended to be generally representative of the top surface of a workbench, the table of a machine tool, or other surface upon which a workpiece is normally held during various shaping and finishing operations. Workpiece 22, specifically illustrated as a block or slab having top surface 24 and upright surface 25, is considered to be representative of any workpiece of metal, wood, plastic or other material upon which manual or machine operations may be performed. It is also understood that clamping device 20 may be secured to surface 23 by any conventional means as will readily occur to those skilled in the various arts to which the instant invention pertains.

Clamping device 20 includes a housing and clamping means generally designated by the reference characters 27 and 28, respectively. Carried by housing 27 and operatively associated with clamping means 28 is actuating means 29 as will be described presently in further detail. Housing 27, which includes center section 30 sandwiched between side plates 32 and 33 secured thereto in conventional manner by cap screws 34, is considered, for purposes of orientation, to have forward end 35, rearward end 37, top 38, and bottom 39, the latter bearing upon surface 23.

With reference to FIG. 2A, in which side plate 32 has been removed to reveal the components within clamping device 20, it is seen that a cavity 40 is formed in housing 27. Cavity 40, which is open at forward end 35, is bounded by upper surface 42, lower surface 43 and end wall 44 formed within center section 30 and side plates 32 and 33. Threaded aperture 45 extends through center section 30 between rearward end 37 and upright wall 44. In accordance with the immediate embodiment of the invention, actuating means 29 assumes the form of a conventional commerically available pressurized fluid motor 47 having threaded section 48 to one end thereof matingly engagable within threaded aperture 45. An operating rod 49, having threaded end 50, projects from motor 47. As will be readily apparent to those skilled in the art, operating rod 49 extends from a piston reciprocally movable within motor 47 in response to the introduction of pressurized fluid, hydraulic or pneumatic, which may be controlled by a remotely located switch.

Referring now to FIGS. 2A and 3, it is seen that clamping means 28 includes movable element 52 having forward end 53, rearward end 54, and lower surface 55, the latter being slidably disposed upon lower surface 43 of cavity 40. Lower surface 55 is recessed along an intermediate portion thereof such that surface 55 is divided into a forward segment 55a and a rearward segment 55b of relatively thin cross-section. A recess 57, terminating at the rearward end with shoulder 58, extends along one side of movable element 52. Flange 59, having threaded aperture 60 therethrough, projects forwardly from forward end 53. Threaded aperture 60 lies along an axis which is substantially perpendicular to supporting surface 23.

A drive member 62 is secured to operating rod 49 by virtue of engagement between threaded aperture 63 and threaded end 50. Member 62 is bifurcated having forwardly extending furcations 64 and 65 with upwardly, rearwardly directed ramp 67 therebetween. A pair of aligned openings 68, being elongate in the vertical direction, extend through furcations 64 and 65 at a location spaced from ramp 67. A link 69 communicates between drive member 62 and movable element 52. Link 69 includes a pair of spaced apart arms 70 and 72 having lower end 73 and upper end 74. Lowers ends 73 of arms 70 and 72 reside on opposite sides of lug 75 integral with movable element 52 and are pivotally secured thereto by pin 77. Roller 78 is rotatably carried between the upper ends 74 by pin 79. A pair of aligned apertures 80 (only one herein specifically illustrated) extend through arms 70 and 72 intermediate the ends thereof. Pin 82, held within apertures 80, terminates with end portions residing within openings 68.

Self-leveling foot 83, having contact surface 84, is swivelly affixed to threaded shank 85 matingly engaged with threaded aperture 60. Threaded aperture 87 extends upwardly through center section 30 from bottom 39. Spring plunger 88, of a commercial available type, is carried within threaded aperture 87. It is also noted that a horizontally oriented pin 89 is carried by side plate 32, as seen in FIG. 1. As further seen in FIG. 2A, pin 89 projects inwardly beyond side plate 32 and resides within recess 57.

Operating rod 49 of fluid motor 47 is reciprocally movable along a linear path as denoted by the double arrowed line A. In FIG. 2A, the device of the instant invention is shown in the retracted, or rest, position, operating rod 49 having moved to the extreme right-hand position holding clamping means 28 within cavity 40. Spring loaded plunger 88 is retracted in response to the downward force of lower surface 55. Pin 89 resides at an intermediate position within recess 57. Pin 82 is proximate the upper ends of openings 68.

Upon initiation of the clamping cycle, as seen in FIG. 2B, operating rod 49 moves in the direction demonstrated by the arrowed line B, urging clamping means 28 from recess 57 to project beyond the forward end 35 of housing 27. Shoulder 58 approaches pin 89 as recess 57 moves relative pin 89. Roller 78 bears against ramp 67 and, in turn, is urged upwardly against upper surface 42 of cavity 40. In general, the components maintain the relationship illustrated in FIG. 2A as clamping means 28 moves in a first direction toward workpiece 22 along an axis substantially parallel to supporting surface 23.

Movement, as described in connection with FIG. 2B, continues until shoulder 58 abuts pin 89. It is apparent that movement in the first direction is along a linear path directed by guide means including operating rod 49 and the contact between surfaces 55 and 43. Shoulder 58 and pin 89 function as a pair of complemental stop members to terminate movement along the linear path.

At the point of termination of movement in the first direction, as is apparent from viewing FIG. 2C, surface 55a projects beyond the forward end 35 of housing 27 and self-leveling foot 83 resides above workpiece 22. In response to continued movement of operating rod 49 along the linear path described by the arrowed line B, drive member 62 continues to move along the prede-scribed linear path. Pin 82, securing the lower end of link 69 to movable member 52, has also terminated movement in the first direction. The upper end of link 69, by virtue of abutment of roller 78 with ramp 67, continues movement in the first direction. As a result of the slope of ramp 67, roller 78 is also urged upwardly against upper surface 42 of cavity 40. In response to the continued application of the linear force from operating rod 49, movable member 52 now moves in a second direction toward supporting surface 23 as illustrated by the arrowed line C. During movement in the second direction, surface 55b functions a a fulcrum and, along with movable member 52 and the connection means between the movable member 52 and the drive member 62, defines translation means for causing movement of movable member 52 in the second direction in response to continued application of a linear force in the first direction. The previously noted connection means is broadly defined to include link 69 and the connective pins.

At termination of movement in the second direction, contact surface 84 of self-leveling foot 83 bears upon the top surface 24 of workpiece 22, anchoring the workpiece to surface 23. The generated clamping force is proportional to the force of fluid motor 47. As will be appreciated by those skilled in the art, the size of fluid motor 47 and the pressure of the fluids supplied thereto, is readily available. It is also noted that the height of contact surface 84 is readily adjustable along an axis substantially perpendicular to surface 23 by rotation of threaded shank 85 within threaded aperture 60. Upon relaxation of force from operating rod 49 and during initiation of retraction, in the direction of arrowed line D, spring plunger 88 raises movable member 52 to elevate surfaces 55a on a plane with surface 43.

FIG. 5 illustrates an alternate clamping device embodying the principles of the instant invention and generally designated by the reference character 110. In general similarity to the previously described embodiment 20, the immediate embodiment 110 includes a housing, a clamping member and actuating means generally designated by the reference characters 112, 113 and 114, respectively, and as will be described presently in further detail. For purposes of orientation, housing 112 is considered to have forward end 115, rearward end 117, top 118, and bottom 119, the latter adapted for bearing upon surface 23.

Housing 112, analogous to previously described housing 27, generally includes a pair of side plates held in spaced relationship by a center section and defining an internal cavity. More specifically, housing 112 includes mirror image side plates 120 and 122, each formed by upright panel 123 without outwardly directed flange 124 at the lower edge thereof, and reinforcing gusset 125. As will be readily recognized by those skilled in the art, side plates 120 and 122 are suitable to be fabricated as stampings or weldments. The center section, as better viewed in FIG. 8, includes upper element 127, lower forward element 128 and lower rearward element 129. Elements 127, 128 and 129 maintain panels 123 in spaced parallel aligned relationship defining a cavity 130 therebetween. Assembly may be by any conventional means such as bolts 132.

Cavity 130, which is open at the forward end 115, is bounded by upper bearing surface 133, the lower surface of element 127 and being parallel with bottom 119. Rearward of surface 133 is downwardly extending projection 134 having threaded aperture 135 extending therethrough. The axis of threaded aperture 135 is parallel to surface 133 and upright panel 123. At the lower portion of cavity 130 is leaf spring 137, secured at the rearward end to element 129 by screw 138 and terminating at the forward end of a downwardly directed lip 139 forward of element 129. Leaf spring 137, which is normally biased in an upwardly direction as indicated by the arrowed line F, has a width sized to be closely received between the inner surfaces of upright panel 123.

Figure 7:
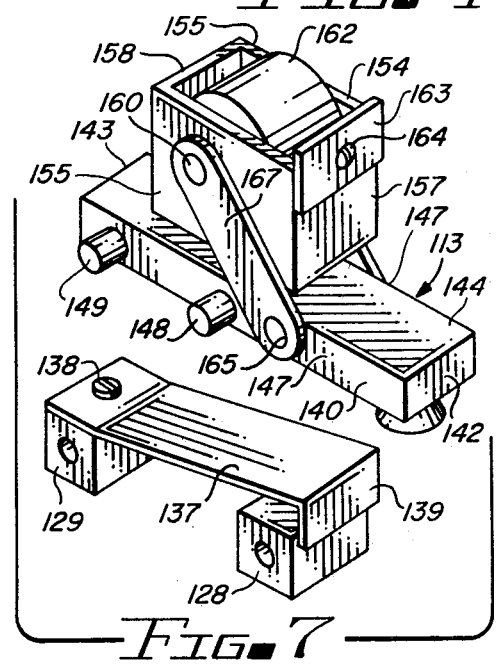
FIG. 7 is a perspective view of the internal components of the clamping device of FIG. 5, the outer housing having been removed.

Referring more specifically to FIG. 7, it is seen that clamping member 113 includes a movable element 140 having forward end 142, rearward end 143, top surface 144, bottom surface 145 and side surface 147. An opposed pair of forward pins 148 and a pair of opposed rearward pins 149 project from side surfaces 147. Forward and rearward pairs of slots 150 and 152, respectively, are formed in upright panels 123. Each pair of slots 150 and 153 is aligned and extends along an axis substantially parallel to bottom 119. The forward pair of slots 150 terminate, at the forward end, with downwardly directed segments 153. Pins 149 are slidably disposed within slots 152 and pins 148 are slidably disposed within slots 150 for reciprocal movement of movable element 140 as will be further described presently.

Actuating means 114 of the immediate embodiment assumes the form of fluid motor 47 described in connection with the previously set forth embodiment. Drive member 154 is reciprocally movable in direct response to fluid motor 47. Drive member 154 includes a pair of upright sidewalls 155 held in spaced parallel relationship by front wall 157 and rear wall 158. Threaded end 50 of operating rod 49 is threadedly engaged within aperture 159 in rear wall 158. Shaft 160 projects through sidewalls 155 and carries rotatable bearing 162. During reciprocal movement of drive member 154, bearing 162 rotatably bears against surface 133. Concurrently, surface 133 is scrubbed by wiper 163 secured to front wall 157 by screw 164.

Pin 165 projects outwardly from either side surface 147 of movable element 140. A link 167 pivotally secures each end of shaft 160 with the respective end of pin 165. Self-leveling foot 83, previously described, depends from movable element 140 proximate the front end 142 thereof. As with the previous embodiment, the immediate embodiment may be secured to a support surface by any convenient means such as bolts extending through openings 167.

Figure 8:
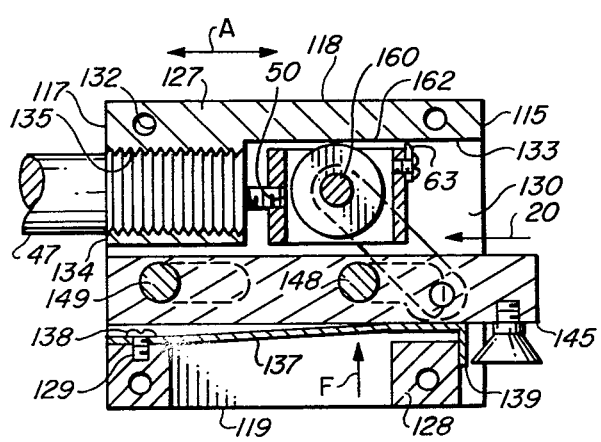
FIG. 8 is a vertical sectional view taken along the line 8—8 of FIG. 5.

Operation of the immediately described embodiment 110 is generally analogous to the functioning of the prior embodiment 20 as previously described. Operating rod 49 is reciprocally movable along a linear path as denoted by the double arrowed line A. In FIGS. 5 and 8, operating rod 49 is in the fully retracted position having urged the clamping means, including clamping member 140, to the limit in the second direction as designated by the arrowed line C. Pins 148 and 149 are at the rearward ends of respective slots 150 and 152.

Upon initiation of the clamping cycle, operating rod 49 moves in the direction demonstrated by the arrowed line B urging drive member 154 toward the forward end 115 of housing 112. Driven through the connection of links 167, clamping member 140 projects from the forward end 115 of housing 112, pins 148 and 149 sliding within the respective slots 150 and 152. During the immediate movement, bearing 162 rotates against surface 133.

Figure 6:
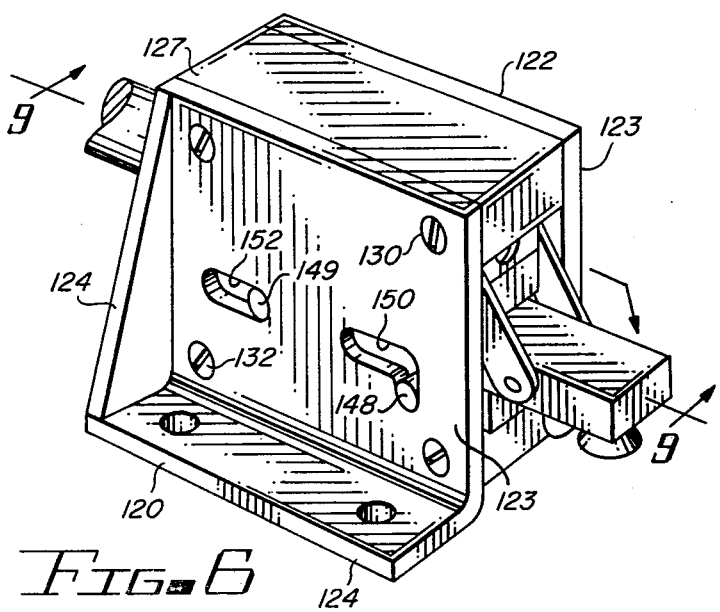
FIG. 6 is an illustration generally corresponding to the view of FIG. 5 and showing the device thereof in the extended position.
Figure 9:
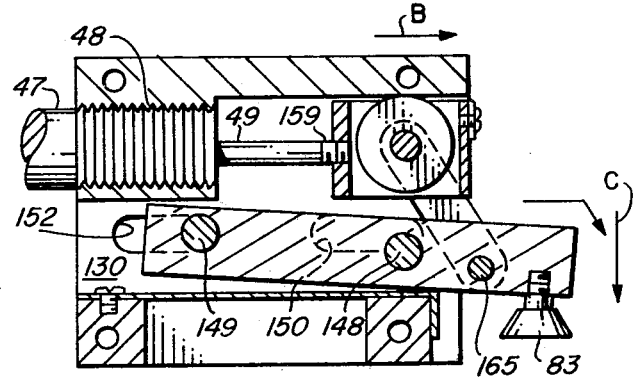
FIG. 9 is a vertical sectional view taken along the line 9—9 of FIG. 6.

The abutment of pin 149 against the forward end of slot 152 functions as stop means to terminate the movement of clamping member 140 in the direction of arrowed line B. Reference is made to FIGS. 6 and 9. Operating rod 49, however, continues to move in the direction of arrowed line B. Pin 149 now assumes the function of a fulcrum for pivotal movement of clamping member 140. Drive member 154, links 167 and pins 165 cooperate as transition means for pivoting the forward 145 of clamping member 140 about the fulcrum formed by pin 149 and urging self-leveling foot 83, and the forward end 145 of clamping member 140, in a second direction, indicated by the arrowed line C, for bearing upon the workpiece. During movement in the direction of arrowed line C, pins 148 move within the respective downwardly directed portions 153 of slots 150 and the angular displacement of links 167 is altered. It is also noted that the forward end of leaf spring 137 is urged downwardly. In response to the relaxation of fluid motor 47 and the release of pressure in the direction of arrowed line C, spring 137 lifts clamping member 140 for alignment of pin 148 with slots 150. In other aspects not specifically described, an understanding of the function of the immediate embodiment can be had with reference to the prior embodiment.

Various modifications and variations to the embodiments herein chosen for purposes of illustration will readily occur to those skilled in the art. For example, while two workpiece engagement means, a clamping foot and a surface engaging edge, have been illustrated, other forms are anticipated. For use in connection with workpieces where marring the surface is not a consideration, the device may be provided with a toothed gripping member for engaging either the top surface of the upright surface of the workpiece. Further, the workpiece engagement means may be a removable element, which may be replaced with a gripping element especially contoured to mate a particular workpiece. The latter would have particular utility in certain mass production techniques. To the extent that such modifications and variations do not depart from the spirit of the invention, they are intended to be included within the scope thereof which is limited only by a fair assessment of the following claims.

Having fully described and disclosed the present invention, and alternately preferred embodiments thereof, in such clear and concise terms as to enable those skilled in the art to understand and practice the same, the claimed invention is:

1. A clamping device for engaging a workpiece and for releasably anchoring said workpiece to a supporting surface, said clamping device comprising:
   a. a housing securable to said supporting surface;
   b. a clamping member movably carried by said housing;
   c. guide means including,
      i. a cavity formed in said housing and having spaced apart upper and lower surfaces,
      ii. a lower surface formed on said clamping member and slidably disposed upon the lower surface of said cavity,
      said guide means directing said clamping member in a first direction substantially parallel to said supporting surface;
   d. stop means for terminating movement of said clamping member in said first direction; and
   e. translation means including,
      i. a fulcrum carried by said clamping member and movable along the upper surface of said cavity,
      ii. a drive member for receiving a linear force,
      iii. an inclined link having a lower end pivotally connected to said clamping member, and an upper end with a bearing surface,
      iv. attachment means intermediate the ends of said link movably affixing said link to said drive member,
      v. means for urging the bearing surface of said link toward the upper surface of said cavity,
      said translation means causing said clamping member to move in a second direction toward said supporting surface subsequent to termination of movement in said first direction.

2. The clamping device of claim 1, wherein said means for urging the bearing surface of said link toward the upper surface of said cavity includes an inclined ramp.

3. The clamping device of claim 2, wherein said bearing surface is in the form of a roller rotatably carried at the upper end of said link.

4. A clamping device for engaging a workpiece and for releaseably anchoring said workpiece to a supporting surface, said clamping device comprising:
   a. a housing securable to said support surface;
   b. a clamping member movably carried by said housing;
   c. guide means including, i. a cavity formed in said housing and having spaced apart upper and lower surfaces, said lower surface having a terminal edge, ii. a lower surface having a terminal edge formed on said clamping member and slidably disposed upon the lower surface of said cavity, said guide means directing said clamping member in a first direction substantially parallel to said supporting surface;

d. stop means for terminating movement of said clamping member in said first direction, said terminal edges being relatively arranged such that the terminal edge of the lower surface of said clamping member projects beyond the terminal edge of the lower surface of said cavity when movement of said clamping member along said linear path is terminated by said stop means; and e. translation means including i. a fulcrum carried by said clamping member and movable along the lower surface of said cavity, ii. a drive member having for having a linear force applied thereto, and iii. connection means communicating between said drive member and said clamping member for exerting a complemental force from said drive member to said clamping member, said complemental force having a first component in said first direction and a second component directed toward the lower surface of said cavity, said clamping member being urged to pivot about said fulcrum in response to said complemental force after termination of movement in said first direction, said translation means causing said clamping member to move in a second direction toward said supporting surface subsequent to termination of movement in said first direction.

5. A clamping device for engaging a workpiece and for releasably anchoring said workpiece to a supporting surface, said clamping device comprising:

a. a housing securable to said supporting surface;

b. a clamping member movably carried by said housing;

c. guide means including, i. an elongate slot formed in said housing and having a longitudinal axis substantially parallel to said supporting surface, ii. a pin carried by said clamping member and slidably disposed within said slot, said guide means directing said clamping member in a first direction substantially parallel to said supporting surface in response to the application of a linear force, d. stop means for terminating movement of said clamping member in said first direction; and e. translation means including i. a drive member having said linear force applied thereto, ii. an inclined link having an upper end pivotally connected to said drive member and a lower end pivotally connected to said clamping member, said translation means causing said clamping member to move in a second direction toward said supporting surface subsequent to termination of movement in said first direction.

6. The clamping device of claim 5, further including:

(a) a bearing carried by said drive member; and (b) a bearing surface having said bearing movable there against the opposition to movement of said clamping member.

7. The clamping device of claim 6, further including a wiper carried by said drive member for cleaning said bearing surface.

* * * * *

UNITED STATES PATENT AND TRADEMARK OFFICE
CERTIFICATE OF CORRECTION

PATENT NO. : 4,451,026
DATED : 29 May 1984
INVENTOR(S) : Robert L. Coope

It is certified that error appears in the above-identified patent and that said Letters Patent are hereby corrected as shown below:

In column 10, line 34, the word "the" should be replaced by --in--.

Signed and Sealed this

Ninth Day of October 1984

[SEAL]

Attest:

Attesting Officer

GERALD J. MOSSINGHOFF

Commissioner of Patents and Trademarks